Figure 1:
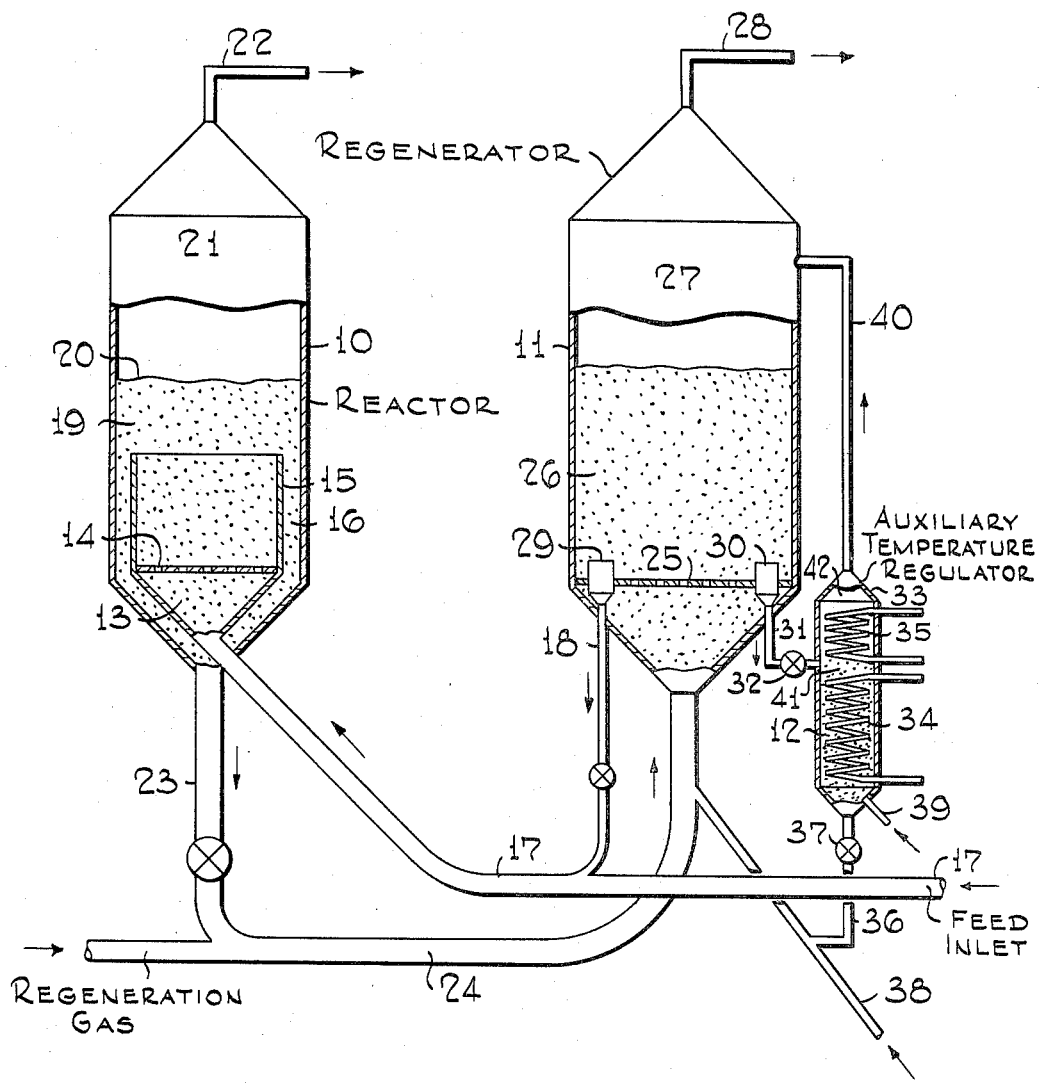

United States Patent Office 2,735,802
Patented Feb. 21, 1956

2,735,802

METHOD FOR CONTROLLING TEMPERATURES IN FLUIDIZED SOLIDS SYSTEMS FOR THE CONVERSION OF HYDROCARBONS

Charles E. Jahnig, Red Bank, N. J., assignor to Esso Research and Engineering Company, a corporation of Delaware Application December 23, 1950, Serial No. 202,494

2 Claims. (Cl. 196—52)

The present invention pertains to a method and apparatus for controlling temperatures of finely divided solids and more particularly for controlling the temperature of finely divided solid catalyst particles used for the conversion of hydrocarbons according to the fluidized solids technique.

The fluidized solids technique has been widely applied for effecting chemical reactions of gases or vapors in contact with solid materials. For example, catalytic cracking of hydrocarbon oils by contacting higher boiling hydrocarbons in vapor form with finely divided cracking catalysts is being carried out today in a number of commercial fluid cracking units having capacities of well over 40,000 bbls. per day. It has also been proposed to effect hydroforming of naphtha fractions by the fluidized solids technique. In hydrocarbon conversion operations such as these, carbonaceous deposits are formed which reduce the activity of the catalyst requiring the regeneration of the catalyst by burning off the carbonaceous deposits. In view of the heat sensitivity of the catalyst materials it is desirable if not essential to control the temperature of the catalyst particles during regeneration. Also in exothermic reactions, such as the synthesis of hydrocarbons by the Fischer-Tropsch process it is desirable to maintain accurate control of the temperature of the finely divided solid catalyst particles and thereby control the temperature of the reaction.

It has been proposed to control the temperature of fluidized solids by arranging heat exchange tubes or coils within the reaction vessel or in an auxiliary vessel through which a stream of the finely divided solid particles is passed. In all cases, however, the heat exchange tubes or coils have been completely covered by the finely divided solids and accordingly the only method of controlling the amount of heat supplied or withdrawn was by varying the temperature of the heat exchange liquid passed through the coils or by varying the rate at which the solid particles are passed through the auxiliary vessel containing the heat exchange tubes or coils. In the case where the heat exchange surface is immersed in the reactor dense phase, adequate control cannot be obtained in many practical cases. The following brief discussion will show why this is the case.

The total rate of heat transfer through any exchanger surface is given by the relation:

$$Q = hA(T_2 - T_1)$$

where $Q$ = heat transfer rate
$h$ = heat transfer coefficient
$A$ = area for heat transfer
$(T_2 - T_1)$ = temp. difference for heat transfer In a fluid bed $h$ can be varied over only a narrow range, and then only by changing velocity or particle size of solids, neither of which is ordinarily practical. Relatively little control can be obtained by trying to vary the heat transfer coefficient on the side opposite from the fluid bed. Moreover, with a completely submerged exchanger the value of $A$ is fixed.

It will be seen that the only control over the rate of heat transfer $Q$ is by varying $(T_2 - T_1)$, the temperature difference across the exchanger surface. Obviously it will ordinarily be undesirable to do this by changing reactor temperature, hence the only real control is by raising or lowering the temperature of the cooling (or heating) fluid flowing inside of the exchanger, and this may lead to serious difficulties. Consider a specific case such as the regenerator of a fluid cracking plant where the excess heat is removed by preheating oil feed in an internal heat transfer bed using a submerged exchanger coil. Typically the regenerator temperature will be 1100° F., while the oil feed may enter at 500° F. and be preheated to 700° F. Now if the heat removal rate is to be decreased appreciably, the only feasible method is to reduce the oil flow rate through the coil and let the oil outlet temperature increase. However, if the oil is preheated much above 700° F. it will crack and coke, plugging the coil and rendering this system of control inoperative.

Thus the ideal means of controlling the heat removal is by changing the exchanger area available for heat transfer. In the present invention, this is conveniently done by varying the bed level to change the amount of surface covered by the bed. By spacing the exchanger surface over a suitable vertical distance, the desired sensitivity of control can be realized. Since the heat transfer coefficient from the dilute phase to the coil is much poorer than from the dense bed, the heat transfer rate is lowered by dropping the bed height and vice versa.

It has also been found that the temperature of finely divided solid particles in fluidized solids reactor systems can be controlled and the heat exchange rate of the exchanger surface may be readily varied as desired by arranging heat exchange tubes or coils in an auxiliary vessel, providing a valved connection between the space surrounding the heat exchange tubes or coils and the dense, fluidized bed within the main reactor vessel for the supply of finely divided solids from the bed into said auxiliary vessel and providing a valve controlled line for the withdrawal of finely divided solids from the base of the auxiliary vessel and the return thereof to the main reactor vessel. By controlling the rate at which finely divided solids are supplied to and withdrawn from the auxiliary vessel, the level of the bed of finely divided solid particles may be readily varied as desired in order to control the amount of heat exchange surface that is in contact with the dense, fluidized body of solids. Since the heat transfer coefficient of the dense, fluidized body of solids is much greater than that of the dilute or disperse phase above the dense bed level, it may be readily seen that this arrangement permits of rapid variation and control of the heat exchange capacity of the unit. Further control can be obtained by varying the rate of circulation and/or the temperature of the liquid passing through the coils as well as by the rate of circulation of finely divided solids.

Controlling the bed level introduces another degree of freedom into the system, and provides greater flexibility in the operation. Thus, by lowering the bed level to reduce the effective heat transfer area, a relatively low heat removal rate can be maintained with a high rate of circulation of solids at high temperature. This is an advantage, particularly where the cooled solids are to be used in a reaction zone before returning to the regenerator. For example, some catalytic cracking units are designed to operate on vapor feed (e. g. the overhead from distillation, coking, etc.) and the heat balance precludes the addition of large amounts of hot regenerated catalyst directly to the reactor. This problem is overcome by controlling the bed level in the heat transfer zone, whereby it is possible to independently control solids circulation rate, solids temperature and rate of heat removal. This flexibility of control is impossible to obtain when the exchanger surface is completely submerged in the bed at all times.

Figure 2:
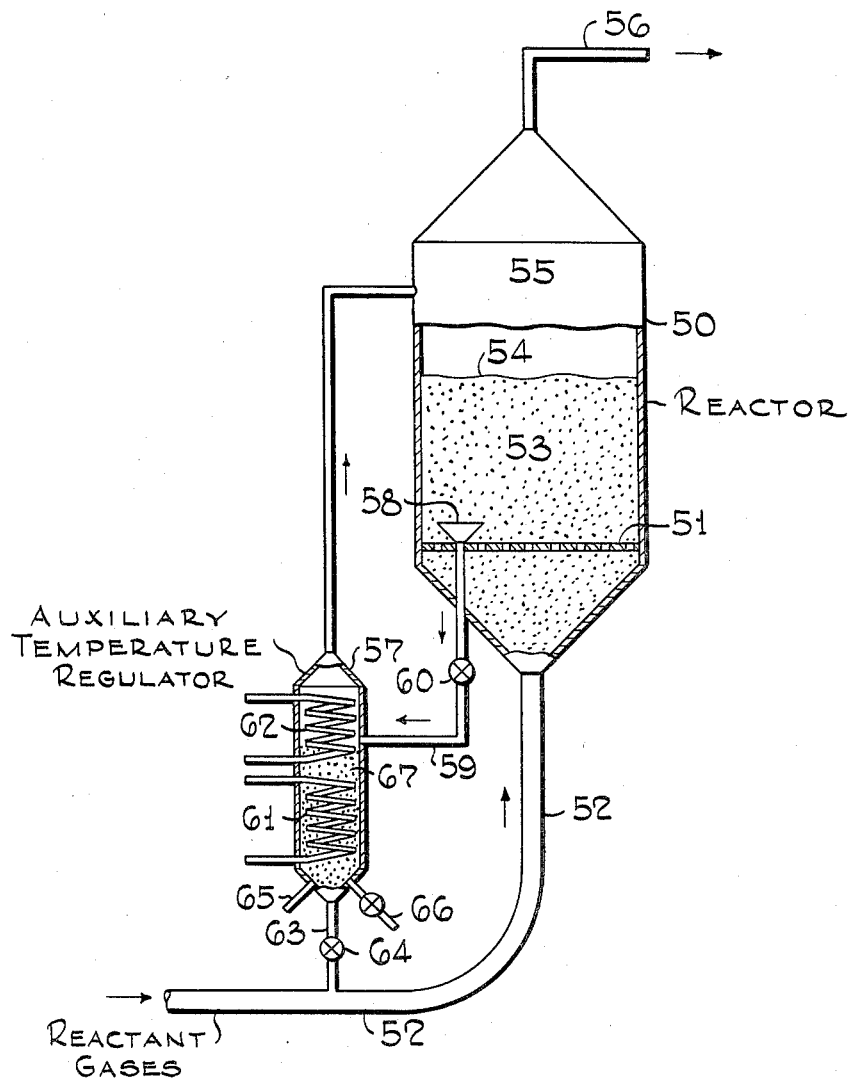

Two embodiments of the present invention are illustrated in the accompanying drawing in which:

Fig. 1 is a diagrammatic illustration of a reactor-regenerator combination with an auxiliary heat exchanger connected to the regenerator vessel and Fig. 2 is a diagrammatic illustration of a reactor with an auxiliary heat exchanger.

Referring to Fig. 1, 10 represents a reactor vessel, 11 a regenerator vessel and 12 an auxiliary temperature regulator. The reactor vessel 10 comprises an inverted conical inlet chamber 13 arranged in spaced relation to the bottom of the vessel, a perforated distribution grid 14 and a cylindrical member 15 surrounding the distribution plate or grid 14 and extending a substantial distance upwardly into the reactor and in spaced relation to the inner wall of the reactor forming an annular passageway 16.

Fresh feed in vapor or liquid form is introduced at 17, hot regenerated catalyst is introduced into line 17 from standpipe 18 and the resultant mixture is introduced into the inlet cone 13 through the distribution grid and thence into the reactor. By controlling the vapor velocity and the rate of supply of finely divided catalyst a dense, turbulent fluidized bed 19 of finely divided catalyst particles is formed in the lower portion of the reactor. The fluidized bed 19 has a definite level 20 and is superposed by a light or disperse phase 21 in the upper part of the reactor. Vaporous reaction products are taken overhead from the reactor through outlet line 22 preferably after passage through cyclone separators (not shown) or the like to remove entrained catalyst particles.

Catalyst particles withdrawn through annular passageway 16 are ordinarily stripped by countercurrent contact with steam or inert gas as they descend through the annular passageway. The stripped particles are then passed beneath inlet cone 13 into spent catalyst standpipe 23. The spent catalyst particles are discharged from the base of standpipe 23 into conduit 24 where they are picked up by a stream of regeneration gas and carried to the bottom of regenerator 11. The catalyst particles and regeneration gas pass through the distribution plate or grid 25 into the main section of the regenerator 11. The velocity of the regeneration gas through the regenerator is so controlled as to form a dense, turbulent bed or body 26 of catalyst particles in the lower portion of the regenerator superposed by a light or disperse phase 27 in the upper part of the regenerator. Regeneration gases are withdrawn overhead from the regenerator through line 28 preferably after passage through cyclone separators or the like which remove the major portion of the entrained catalyst particles for return to the dense bed 26 through dip pipes.

A well 29 is arranged at the upper end of standpipe 18 and extends above distribution plate or grid 25 to collect catalyst from the dense bed for discharge through standpipe 18 into the inlet line 17 to the reactor. A similar well 30 connected to conduit 31 is also arranged to project above plate 25 to permit withdrawal of catalyst directly from bed 26. A valve 32 is provided in line 31 in order to control the flow of catalyst through line 31 into auxiliary regulator chamber 12 which is characterized by a relatively small horizontal cross-section as compared with the horizontal cross-section of regenerator 11. Coils 34 and 35 are arranged in chamber 12 for the circulation of a suitable heat exchanger fluid therethrough in indirect heat exchange relation to the finely divided catalyst particles passing through chamber 12. While two coils are shown it will be understood that a single coil or a plurality of straight tubes connected to suitable manifolds or headers may be used if desired. A conduit 36, provided with a valve 37 is arranged for the withdrawal of catalyst from the bottom of chamber 12. The conduit 36 discharges into conduit 38 where a stream of regeneration or any suitable carrier gas is passed to convey catalyst particles into conduit 24 and thence back into the regenerator. One or more taps 39 are provided in the regulator chamber 12 for the introduction of gas to maintain the catalyst particles in fluidized condition. A conduit 40 connects the upper part of chamber 12 with the upper part of regenerator 11 in order to vent off gases released in chamber 12.

In the embodiment of this invention catalyst flows from dense bed 26, through well 30 conduit 31 and valve 32 into an intermediate or lower portion of chamber 12. Catalyst is withdrawn from the bottom of chamber 12 through conduit 36, valve 37 and is then returned to regenerator 11 through lines 38 and 24. By regulation of valves 32 and 37, the level of dense fluidized catalyst bed 41 within chamber 12 may be varied as desired. Increasing the level of the dense bed increases the area of heat exchange tubes or coils in contact with the dense fluidized catalyst particles and decreases the area of heat exchange tubes or coils in contact with the dilute or disperse phase 42 in the upper part of chamber 12.

Conversely lowering the level of the dense fluidized bed in chamber 12 reduces the area of heat exchange tubes in contact with the dense fluidized bed and increases the area of heat exchange tubes in contact with the dilute or disperse phase. Since the heat transfer coefficient of the dense fluidized bed is much greater than the heat transfer coefficient of the dilute or disperse phase it may be seen that the arrangement shown permits of ready and rapid variation in the heat exchange capacity of the auxiliary temperature regulator. There is no need to change the flow rate of cooling fluid in the exchanger coils 34 and 35. Also it should be noted that as less heat is transferred in the exchanger 12, the cooling fluid outlet temperature will decrease at constant fluid flow rate, whereas if this cooling coil were completely immersed in the regenerator bed 26, the fluid flow rate would have to be decreased and the outlet temperature allowed to increase.

Fig. 2 illustrates the present invention embodied in a reactor system in which an exothermic reaction such as the Fischer-Tropsch reaction is being conducted. In this embodiment, 50 is the main reactor vessel provided with a perforated distribution plate or grid 51 near its bottom and an inlet conduit 52 connected to the bottom of the reactor for the supply of reactant gases thereto. Finely divided solid catalyst particles are provided within the reactor vessel and the velocity of the reactant gases therethrough is so controlled as to form a dense, fluidized bed 53 having a level 54 in the lower part of the vessel 50 superposed by a dilute or disperse phase 55 in the upper part of the reactor vessel. Since the catalyst does not require regeneration, such amounts of catalyst as may be necessary to replace losses and maintain catalyst level in the reactor may be introduced along with reactant gases. Reaction products are taken overhead from reactor 50 through conduit 56, preferably after passage through cyclone separators or the like for the removal of entrained catalyst particles which are returned to the dense bed 53 through dip pipes.

An auxiliary temperature regulator chamber 57 is arranged below the main reactor chamber. An inlet well 58 is arranged above the distributor plate 51 in reactor 50 for receiving catalyst particles directly from the dense bed 53 and supplying the same to conduit 59 which is provided with a flow control valve 60 and has its discharge end connected to auxiliary temperature regulator 57. Coils 61 and 62 are arranged in chamber 57 for the circulation of heat exchange fluid therethrough in indirect heat exchange relation to the finely divided catalyst particles passing through said chamber. Coils 61 and 62 may be formed as a single coil or may be straight tubes connected to suitable manifolds or headers. A conduit 63 provided with a flow control valve 64 connects the bottom of chamber 57 with conduit 52 for controlling the withdrawal of catalyst from the auxiliary temperature control chamber 57 and the discharge of the same into conduit 52 for recycling to the main reactor 50 along with the reactant gases. Other means of returning solids may be used if desired. One or more aeration taps 65 may be provided near the base of chamber 57 for the introduction of fluidizing gas. A valved outlet pipe 66 may be provided at the base of chamber 57 for the withdrawal of catalyst from the reactor system if it should be desired to remove catalyst for reactivation or for replacement by fresh catalyst to maintain the activity of the catalyst bed. The operation of this chamber is the same as the chamber 33 of Fig. 1, the rate of flow of catalyst to and rate of withdrawal of catalyst from chamber 57 controlling the depth of the dense bed of catalyst particles 67 within the chamber 57 and thereby controlling the ratio of the area of heat exchanger tubes in contact with dense bed to area of heat exchanger tubes in contact with a dilute or disperse phase in order to establish the desired heat exchange capacity to the system.

While in both of the above embodiments the auxiliary temperature regulator is attached to reactor or regenerator vessels in which an exothermic reaction is being conducted, it will be understood that the arrangement could also be applied to systems wherein the reaction is endothermic by circulating a hot heat exchanger fluid through the coils in the auxiliary temperature regulator chamber in order to add heat to rather than remove heat from the catalyst particles.

The foregoing description contains a limited number of embodiments of the present invention. It will be understood, however, that numerous variations are possible without departing from the scope of the following claims.

What is claimed is:

1. In a process for the conversion of hydrocarbons in contact with finely divided catalytic solids wherein said catalytic solids are continuously circulated from a hydrocarbon conversion zone to a separate regeneration zone where inactivating carbonaceous deposits are burned from the catalytic solids and thence back to the conversion zone, and wherein an oxygen-containing regeneration gas is supplied to the regeneration zone at a sufficient rate to maintain the finely divided catalytic solids therein as a dense fluidized bed, the improvement which comprises withdrawing hot catalytic solids from said dense fluidized bed of the regeneration zone, maintaining the withdrawn catalytic solids as an auxiliary dense fluidized bed having an upper level and a disperse phase thereabove in a heat exchange zone having a relatively small horizontal cross section in comparison with the horizontal cross section of the dense fluidized bed in the regeneration zone, maintaining a cool heat exchange fluid in indirect heat exchange relation with the withdrawn catalytic solids along a heat exchange surface extending from the auxiliary dense fluidized bed into the disperse phase thereabove, thereby cooling the said catalytic solids, withdrawing cooled catalytic solids downwardly from the auxiliary dense fluidized bed, mixing the withdrawn cooled catalytic solids with oxygen-containing regeneration gas, and passing the resultant mixture into said regeneration zone, and regulating the rate at which the catalytic solids are supplied to and withdrawn from the auxiliary dense fluidized bed in order to control the position of the upper level of the said auxiliary dense fluidized bed in contact with the heat exchange surface and thereby control the proportion of the heat exchanger surface immersed in the auxiliary dense fluidized bed.

2. A process according to claim 1 wherein the conversion of hydrocarbons involves hydroforming of hydrocarbon fractions boiling in the naphtha boiling range, in contact with finely divided hydroforming catalyst particles.

References Cited in the file of this patent

UNITED STATES PATENTS

| | | |
|---|---|---|
| 2,447,505 | Johnson | Aug. 24, 1948 |
| 2,477,042 | Burnside | July 26, 1949 |
| 2,492,948 | Berger | Jan. 3, 1950 |
| 2,506,317 | Rex | May 2, 1950 |
| 2,515,156 | Jahnig et al. | July 11, 1950 |
| 2,573,795 | Lanning | Nov. 6, 1951 |